(12) United States Patent
Scully, Jr. et al.

(10) Patent No.: US 11,900,778 B1
(45) Date of Patent: Feb. 13, 2024

(54) SYSTEM FOR IMPROVING SAFETY IN SCHOOLS

(71) Applicant: MICRO APPS GROUP INVENTIONS, LLC, Colchester, VT (US)

(72) Inventors: John Thomas Scully, Jr., Colchester, VT (US); Lee Bryan, Essex Junction, VT (US); Mark Robert Schneider, Williston, VT (US); Patricia Lynn Scott, Fairfax, VT (US); Vladimir Kogan, Shelburne, VT (US)

(73) Assignee: MICRO APPS GROUP INVENTIONS, LLC

( * ) Notice: Subject to any disclaimer, the term of this patent is extended or adjusted under 35 U.S.C. 154(b) by 0 days.

(21) Appl. No.: 18/127,728

(22) Filed: Mar. 29, 2023

(51) Int. Cl.
*G08B 21/02* (2006.01)
*G06V 40/16* (2022.01)
*G06V 20/52* (2022.01)
*G08B 25/00* (2006.01)

(52) U.S. Cl.
CPC ............. *G08B 21/02* (2013.01); *G06V 20/53* (2022.01); *G06V 40/161* (2022.01); *G08B 25/006* (2013.01)

(58) Field of Classification Search
CPC ...................................................... G08B 21/02
See application file for complete search history.

(56) References Cited

U.S. PATENT DOCUMENTS

| | | | |
|---|---|---|---|
| 4,694,284 | A | 9/1987 | Leveille et al. |
| 4,744,083 | A | 5/1988 | O'Neill et al. |
| 4,799,062 | A | 1/1989 | Sanderford, Jr. et al. |
| 4,818,998 | A | 4/1989 | Apsell et al. |
| 4,819,860 | A | 4/1989 | Hargrove et al. |
| 4,839,656 | A | 6/1989 | O'Neill et al. |
| 4,885,571 | A | 12/1989 | Pauley et al. |
| 4,918,432 | A | 4/1990 | Pauley et al. |
| 4,952,913 | A | 8/1990 | Pauley et al. |
| 4,965,586 | A | 10/1990 | O'Neill et al. |
| 5,021,794 | A | 6/1991 | Lawrence |
| 5,027,314 | A | 6/1991 | Linwood et al. |
| 5,196,825 | A | 3/1993 | Young |
| 5,225,809 | A | 7/1993 | Bunn |

(Continued)

*Primary Examiner* — Travis R Hunnings
(74) *Attorney, Agent, or Firm* — H. Jay Spiegel

(57) ABSTRACT

A method for improving safety and property protection in schools comprising fixed and mobile safety and security devices, networked together. A software App provides real-time communication among various devices. The network integrates disparate security devices into a unified system to expand coordination and communication among public safety personnel. The system automatically triggers alarms, cell phone notifications, and warnings, as well as defensive measures, when its sensors or safety devices detect or report threats to public safety and property. Each device in the system is pre-programmed to respond independently while simultaneously sharing its findings with all other devices and security personnel in the network. Deployment of these disparate devices gives security personnel heightened awareness, real-time status of secured and unsecured building entrances, around-the-clock visualization, and faster response times in both indoor and outdoor emergencies.

19 Claims, 9 Drawing Sheets

(56) References Cited

U.S. PATENT DOCUMENTS

| | | |
|---|---|---|
| 5,225,842 A | 7/1993 | Brown et al. |
| 5,334,974 A | 8/1994 | Simms et al. |
| 5,357,254 A | 10/1994 | Kah, Jr. |
| 5,396,227 A | 3/1995 | Carroll et al. |
| 5,461,390 A | 10/1995 | Hoshen |
| 5,515,419 A | 5/1996 | Sheffer |
| 5,559,520 A | 9/1996 | Barzegar et al. |
| 5,587,704 A | 12/1996 | Foster |
| 6,072,396 A | 6/2000 | Gaukel |
| 6,175,308 B1 * | 1/2001 | Tallman .............. B60R 25/102 340/426.2 |
| 6,198,390 B1 | 3/2001 | Schlager et al. |
| 6,239,700 B1 | 5/2001 | Hoffman et al. |
| 6,624,754 B1 | 9/2003 | Hoffman et al. |
| 8,149,124 B2 | 4/2012 | Hoffman et al. |
| 8,466,795 B2 | 6/2013 | Hoffman et al. |
| 8,472,915 B2 | 6/2013 | DiPerna et al. |
| 8,484,352 B2 | 7/2013 | Piett et al. |
| 8,516,122 B2 | 8/2013 | Piett et al. |
| 8,768,294 B2 | 7/2014 | Reitnour et al. |
| 9,043,882 B2 | 5/2015 | Keohane et al. |
| 9,078,092 B2 | 7/2015 | Piett et al. |
| 9,424,725 B1 * | 8/2016 | Keohane .............. H04W 4/021 |
| 9,449,490 B2 * | 9/2016 | Dodson .............. G08B 25/006 |
| 9,489,825 B1 | 11/2016 | McDonnell et al. |
| 10,699,555 B2 * | 6/2020 | Robison ............. G08B 21/0269 |
| 11,265,404 B2 | 3/2022 | DiPerna |
| 11,445,349 B2 | 9/2022 | Mehta et al. |
| 2005/0169367 A1 * | 8/2005 | Venetianer ....... G08B 13/19652 375/E7.006 |
| 2015/0356345 A1 * | 12/2015 | Velozo ................ G06V 40/161 382/103 |
| 2017/0004694 A1 * | 1/2017 | Dodson ................ G08B 21/02 |
| 2020/0137212 A1 * | 4/2020 | Borse .................... G08B 21/02 |
| 2021/0040761 A1 * | 2/2021 | de Geus ................ E04H 9/10 |

* cited by examiner

SYSTEM FOR IMPROVING SAFETY IN SCHOOLS

BACKGROUND OF THE INVENTION

The present invention consists of a new and unobvious way of improving personal safety on school grounds and in school facilities.

Random violence has become a fact of life in America. This is alarmingly true in academic environments where students gather to be educated. Schools are vulnerable settings, which, in recent years, have experienced dramatic compromises in personal safety. Today, many of the approximately 49.4 million students, who attend pre-kindergarten to grade 12, and 19.4 million students, who attend colleges and universities, live in fear that their school or nearby environment might be the next target of random or planned violence.

Schools also face daily personal safety issues ranging from hazing, bullying, and interpersonal conflicts to stalking, theft, physical assault, and sexual attacks.

In its latest annual school account, the National Center for Education Statistics (NCES) reports that 77 percent of public schools nationwide recorded one or more criminal incidents on their grounds. These amount to 1.4 million annual incidents. In the previous reporting period, an estimated 962,300 violent incidents occurred in 71% of public schools. Another 476,100 non-violent incidents occurred in 65% of public schools.

Gunfire on school grounds has similarly become an all-too-frequent occurrence at both primary/secondary schools and colleges. NCES has documented and compiled data (Fall 2021) that underscore the seriousness of the problem. In the last two decades, there has been a 900% increase in school shootings resulting in casualties.

During the 2020-21 school year, there were 93 school shootings with casualties at public and private elementary and secondary schools. This is more than in any other year since data collection began, according to the Report on Indicators of School Crime and Safety: 2021.

Of these 93 school shootings with casualties, 43 resulted in deaths. (An additional 53 schools reported shootings with no casualties.). The severity of the problem was highlighted across the nation in January 2023 when police reported that a 6 year-old Virginia student wounded his teacher after pulling a handgun from a backpack and shooting her while she was teaching his first-grade class.

A National Public Radio report, updated on Jul. 4, 2022, noted that random gun violence has become a common event in the USA with serious mental and emotional effects on the wellbeing of children and young adults. According to the Gun Violence Archive, (GVA), an independent data collection organization, there were 692 shootings in 2021, up from 610 in 2020 and 417 in 2019. In the first six months of 2022, "the country . . . experienced 309 mass shootings. This averages out to more than 10 a week." (GVA defines a mass shooting as an incident in which four or more people, excluding the shooter, are shot or killed.)

The dire effect that escalating random violence has on the psyches of students cannot be underestimated. On Jul. 6, 2022, NBC News reported that gun violence is now the leading cause of death among adolescents in the USA. On average, 22 kids are shot per day in America.

According to the Rape, Abuse, & Incest National Network (RAININ), sexual violence is the most prevalent crime committed on college campuses and nearby environments. Among undergraduate students, 26% of females and 7% of males experience rape or sexual assault through physical force, violence, or incapacitation. Another 6% will be stalked during their college days. Though guns are restricted on most college campuses, in recent decades there have been 190 incidents at 142 colleges in which at least one person was intentionally shot (excluding the shooter), either on campus or within two miles of the campus.

At the college level, a September 2021 national survey of 1,002 college students, conducted by Engine Insights, drawn from a demographically representative sample of the USA population, revealed that personal safety is of critical importance to college students. Commissioned by the Clery Center, a national nonprofit focused on promoting campus safety, and ADT, the home security company, findings included:

More than 82% of college students report feeling concerned about their personal safety; greater than 50% saying they are very or extremely concerned.

Even common activities of campus life, like being in an unfamiliar area (82%), interacting with strangers (78%), walking home in the dark (74%), or leaving a bar/party alone (65%), make students feel unsafe. In November 2022, four University of Idaho students were slaughtered in their beds by a knife-wielding assailant.

An overwhelming majority of college students (97%) say they consider "personal safety" as they go about daily campus.

Students routinely try to protect themselves by always carrying their phone (75%), familiarizing themselves with their surroundings (58%), and traveling in groups or pairs (43%).

Currently, students at primary and secondary schools rely on staff, local police, and 911 cellphone calls for protection. Security cameras are not widely deployed. At the college/university level, public safety personnel are supported by security cameras, Blue-Light call boxes, and more recently, smartphone Apps, which are popularly downloaded by students onto their cellphones.

Security Cameras

Camera technology captures images and videos that can be compressed, stored, analyzed and transmitted over communication networks. It may also send instant alarms, based on pre-set rules or detection of unusual activity. While this is an important technology, it has its limitations. The fixed locations of cameras, limited field of view, and short range allow resourceful trespassers and offenders to bypass the camera's line-of-sight limits, as well as block camera imagery. Hackers have been known to access and deactivate cameras. Crucially, a security camera cannot stop a crime from being committed; its value lies in recording an incident for evidentiary purposes.

Emergency Blue-Light Call Boxes

Blue-light boxes are emergency alarm stations, strategically located throughout a campus to provide assistance to anyone in distress. A blue beacon is characteristically positioned above each pole. Some are programmed to alert students via public address systems, social media posts, text messages, and email.

Statistically, few emergency calls are made via Blue-light phones. However, they remain popular symbols of perceived security. According to Campus Safety Magazine's report: "Despite Decline in Usage, Blue Light Emergency Phones Are Here to Stay" almost 100% of private schools (15,000+ students or more) have a Blue-light phone system. They are also present at 92% of all university campuses.

Given their high visibility, offenders seldom commit a crime in close proximity. Today many schools question their cost effectiveness (approximately $20,000 per installed device, plus annual maintenance fees), especially since data shows they are most often used for prank calls, requests for facility maintenance, and appeals to "open a locked door," rather than emergency assistance.

In 2016, the Indiana Daily Student reported that the university's 56 emergency Blue-light call boxes had been used to make four legitimate calls in twenty years.

In 2020, following student protests for the installation of Blue-light boxes along Fraternity Drive, The University of Florida Student Newspaper conducted a survey among local campuses to assess how frequently Blue-light boxes were used. It uncovered a significant lack of emergency use among Florida campuses. Of 508 Blue-light activations at the University of Florida between January 2017 and January 2019, only 14 (2.7%) required police action. Of these, only one was an emergency. At the University of Central Florida—which has 260 emergency call boxes throughout its campus-6% of activations required "assistance." The majority of calls were for vehicle assistance. At the University of South Florida (90 boxes) and the University of West Florida (50 boxes), less than 1% of Blue-light box activations required security assistance.

Smartphone Apps

Smartphone Apps allow student communities to contact administrators and campus security by activating a button on their cell phones. Though free for students to download, schools are typically charged an annual fee depending on the number of features in use. (According to a University of Missouri Police Press release, the Rave Guardian App system costs the school $8,000 a year.)

Such Apps enable two-way texting; anonymous tips about suspicious behavior; and, virtual escort requests for students walking alone. While popular, reliability is an issue. Their ability to fully replace Blue-light boxes is limited by spotty Wi-Fi connections on many campuses and buildings. Phones are further limited by students venturing out without a fully charged phone or forgetting them in dorm rooms.

As Case Emergency Systems, a consultant on emergency phones and call boxes for public safety applications, points out in its Feb. 10, 2020 report, "Smartphone vs. Safety—Do Our Mobile Devices Give Us a False Sense of Security?" smartphones fail to address many of the most pressing concerns regarding personal and public safety, including lost phones, "dead zones," low or no battery power in critical situations, and the theft of purses and backpacks with cell phones inside.

Recent history shows that relying on one's cellphone during an emergency can be a risky option. A person surprised by a perpetrator will need to access and open the phone App within seconds. In a stressful moment, one's ability to remove a smartphone from a pocket and activate a safety App is problematic. Additionally, people focused on texting or listening to programs, especially while wearing earbuds/headphones, are often unaware of their surroundings. This increasingly makes them vulnerable targets of opportunity. In New York City, the Dept. of Public Safety has released a public service video, warning people not to carry an electronic device in open sight: Danger of Relying Exclusively on a Smartphone for Personal Safety.

Despite these security measures, schools are at a distinct disadvantage when it comes to protecting students and teachers. The chances that police will be in earshot during an attack are low. The U.S Justice Department estimates that just 12% of stalkers and 6% of rapists are caught in the act. Research confirms that calls to the police are insufficient for deterrence and that law enforcement rarely responds before a criminal act occurs. In fact, surveyed police chiefs acknowledge that officers rarely break up a personal assault or property crime. More often than not, law enforcement's role is pursuit, investigation, apprehension and testimony during the prosecution of a criminal act.

For these reasons, there is a need for a new school safety system that does not rely on human intervention to instantly sound an alarm, secure facilities, and deploy defensive measures. It is with these issues in mind that the present invention was conceived.

PRIOR ART KNOWN TO APPLICANTS

The prior art known to the applicants utilizes technology to improve school security systems. It consists primarily of cellular phones, smartphones Apps, video surveillance cameras, video processing and analytics, and secure network and facility access controls.

U.S. Pat. No. 5,587,704 A, Code Blue Light Audio and Visual Alarm Apparatus, Dec. 24, 1996, to Foster, describes an apparatus, plugged into an electrical wall outlet for energization with a battery back-up. It sounds a siren-type tone and illuminates a flashing blue light when manually activated by remote control through a transmitter on a pendant worn by a user. The flashing blue light is typically set in a prominent window at the user's location to alert and guide neighbors, quick-response assistance personnel and passersby, in general, respecting an emergency condition. This patent describes an early adaption of a Blue-light station, activated by a remote transmitter only. It does not disclose a multi-tiered alerting and security system.

U.S. Pat. Nos. 6,198,390; 6,072,396; 5,559,520; 5,515,419; 5,461,390; 5,396,227; 5,357,254; 5,334,974; 5,225,842; 5,225,809; 5,196,825; 5,027,314; 5,021,794; 4,885,571; 4,918,432; 4,952,913; 4,819,860; 4,818,998; 4,799,062; 4,744,083; 4,839,656; 4,965,586 and 4,694,284 are cited as disclosing early attempts to use phones to provide warnings. Many of these references describe various safety systems utilizing cellular networks. None disclose a cellular-phone based personal safety device that works in conjunction with other personal safety devices over a personal area network. While these devices fulfill their respective, particular objectives and requirements, the aforementioned patents do not disclose the present invention.

U.S. Pat. No. 6,239,700, May 29, 2001, U.S. Pat. No. 6,624,754, Sep. 23, 2003; U.S. Pat. No. 8,149,124, Apr. 3, 2012; and U.S. Pat. No. 8,466,795, Jun. 18, 2013 describe signaling systems that provide an alarm for an individual in distress, which can be combined with a locating and tracking system, possibly by cellular phone. Their purpose is to alert and direct appropriate personnel to the plight and location of an individual in distress. The system includes a portable signaling unit, a remote alarm switch device, a central dispatch station, and makes use of a wireless communication system. The portable signaling unit and the remote alarm switch may be adapted to be worn at different locations on a person's body. The remote alarm switch may be concealed in the form of a wristband or in the form of any other object such as a broach, pendant, or keychain. Even though a wireless remote is described that is separate from the cellular phone, these patents do not disclose that their wireless remotes contains other personal safety devices, nor operation of cooperating devices in a unified network.

U.S. Pat. No. 8,472,915, Jun. 25, 2013, to DiPerna et al., discloses a cellular phone with personal protective spray and a panic button. When the button is activated, the personal protective spray is released and the phone records audio and/or video for transmission. It also transmits the data to emergency response personnel, and provides them with cellular phone location via GPS in the phone. It requires attaching one or more devices to the phone, which may include modification of the cellular phone. It does not work in conjunction with multiple personal safety devices and surveillance systems synchronized over a local network. Nor does it provide real-time alerting to all cell phones in the local network along with notifications to law enforcement and professional monitoring service.

U.S. Pat. No. 8,484,352 for Emergency Information Services, Jul. 9, 2013, to Piett et al., and U.S. Pat. No. 8,516,122 for Emergency Information Services, Aug. 20, 2013, to Piett et al. disclose a method for providing user data to an emergency service provider that first enrolls a user in an emergency information system, including configuring a communication device associated with the user to deliver an access identifier to an emergency service provider when the user contacts the emergency service provider using the communication device. The method also includes maintaining, in a data storage module of the emergency information system, a database including user data associated with the user. The user data is associated with the access identifier. The method further includes receiving via a communication network linked to the emergency information system an access request from the emergency service provider. It does not work in conjunction with multiple personal safety devices and surveillance systems synchronized over a local network while providing real-time alerting as well as self-protective measures, nor does it provide real-time data to all cell phones in the network as well as law enforcement and professional monitoring services.

U.S. Pat. No. 8,768,294 for Notification and Tracking System for Mobile Devices, dated Jul. 1, 2014, to Reitnour et al., describes a notification and tracking system for a mobile device. The system includes a mobile device application that is adapted to be stored in memory on the mobile device. The application, upon activation, determines the GPS coordinates of the mobile device, records digital images over a period of time, sends a preset message from the mobile device to at least one recipient, preferably an emergency responder, such as a security monitoring station, and including GPS coordinates and digital images. The coordinates and images may be sent to one or more servers for storage and can be accessed by the emergency responder. The coordinates and images are periodically updated and sent while the program is activated. It does not work in conjunction with multiple personal safety devices and surveillance systems synchronized over a local network, nor does it provide real-time alerting as well as a self-protective measure. Transmitted real-time data is not sent to all cellphones in a network along with law enforcement and professional monitoring services.

U.S. Pat. No. 9,043,882 B2 for Integration of Home Security into Existing Infrastructure, May 26, 2015, to Keohane et al., relates to administering access to a wireless network by detecting a connective proximity of a device to the network, determining that the device is an authorized device based on information, connecting the authorized device to the network, and causing the connection of the authorized device to the network to be provided as an output status. It does not work in conjunction with multiple personal safety devices and surveillance systems synchronized over a local network. Nor does it provide real-time alerting as well as self-protective measures while transmitting real-time data to all cell phones in the network as well as law enforcement and professional monitoring services.

U.S. Pat. No. 9,078,092, Routing Engine for Emergency Communications, Jul. 7, 2015, to Piett et al., discloses a computer-implemented method for processing emergency calls, includes receiving an emergency call from a calling device via a first communication format, identifying a location associated with the calling device, identifying a destination for the emergency call, based at least in part on the location, determining an attribute associated with the destination, and determining an action to be taken based at least in part on the first communication format and on the attribute. It does not work in conjunction with multiple personal safety devices and surveillance systems synchronized over a local network nor does it provide a real-time alerting as well as self-protective measures.

U.S. Pat. No. 9,424,725 B1 for School Perimeter Security System, Aug. 23, 2016, to Keohane et al., discloses a school perimeter security system that includes a registry database. The registry database includes: registered student mobile device identifiers, registered non-student mobile device identifiers, and a matching of students with authorized non-students with whom the students are permitted to be paired with near the perimeter. At least three beacon devices are located within the school perimeter, positioned to establish a boundary area near the perimeter, detect and establish communication with mobile devices entering the boundary area, obtain an identifier from each mobile device that enters the boundary area, and facilitate trilateration of all mobile devices within the boundary area. The processor and beacon devices cooperatively interact to identify every mobile device entering the boundary area, track the location of every mobile device within the boundary area, compare the identified mobile devices with identifiers in the registry database and, transmit an alert notice when a condition is satisfied. It requires attaching devices to the phone or modification of the cellular phone. It requires setting up beacon devices on a school property and does not work in conjunction with multiple personal safety devices and surveillance systems synchronized over a local network while providing real-time alerting as well as self-protective measures. It does not provide real-time data to all cellphones in the network as well as law enforcement and professional monitoring services.

U.S. Pat. No. 9,489,825, to McDonnell et al. for Computerized School Safety System, discloses a computerized school safety system for providing information to an emergency responder about an alert at a school. The system includes a computerized processor including programming configured to monitor inputs from a mobile computerized device within the school, the inputs including location data for the mobile computerized device. It combines the inputs with a floor plan for the school, and provide a tactical display to the emergency responder comprising the combined inputs and floor plan.

U.S. Pat. No. 10,699,555 for System and Method of Alerting and Responding to a School Emergency, Jul. 30, 2020, to Robison, provides a system and method of alerting and responding to a school emergency by enabling faculty members to simultaneously alert other faculty members and students of an emergency. The method allows faculty members to automatically contact a first responder in order to resolve the emergency. The faculty member is able to include details of an emergency such as, but not limited to, the location of the emergency and the type of emergency situation. Additionally, the method notifies parents after the emergency is resolved and provides a feature which allows parents to find their children using a global positioning system (GPS) module. It does not work in conjunction with multiple personal safety devices and surveillance systems synchronized over a local network. Nor does it provide real-time alerting as well as self-protective measures, nor does it enable students to provide real-time data to all cellphones in the network as well as law enforcement and professional monitoring services.

U.S. Pat. No. 11,265,404 for Emergency Personal Protection System Integrated with Mobile Devices, Jan. 30, 2019, to DiPerna discloses a mobile device that includes a camera unit, a location unit, a transmitting unit, a self-defense mechanism, and a panic button. The camera unit's location unit obtains at least one of image data and audio data, and the location unit obtains location data. The transmitting unit transmits at least one of the image data, the audio data, the location data, and specific information including owner identification information. The panic button is adapted to activate the camera, the location unit, the transmitting unit, and the self-defense mechanism. It does not work in conjunction with multiple personal safety devices and surveillance systems synchronized over a local network while providing real-time alerting as well as self-protective measures, nor does it provide real-time data to all cellphones in the network as well as law enforcement and professional monitoring services.

U.S. Pat. No. 11,445,349 for Systems and Methods for Emergency Communications Amongst Groups of Devices Based on Shared Data, Sep. 13, 2022 to Mehta et al. discloses systems, devices, methods, and media for managing emergency communications providing data sharing amongst groups of devices, proxy calling by one communication device on behalf of another, and seamless data extraction from a communication device by first responders. It does not work in conjunction with multiple personal safety devices and surveillance systems synchronized over a local network while providing real-time alerting as well as self-protective measures.

SUMMARY OF THE INVENTION

The present invention relates to a new way to improve personal safety on school grounds and in school facilities, and includes the following interrelated objects, aspects, and features:

Schools and outdoor venues are environments with a porous security perimeter, which can benefit by the multi-tiered awareness and safety systems (MASS) taught in the present invention.

(1) A main object of this invention is to create a safety dome, especially around schools (pre-K through college) for students, teachers, administrators, and visitors. The MASS system is designed to tip the scale against anti-social and criminal activity as well as vandalism and property damage. It accomplishes this by complementing and improving upon existing security systems, such as Blue-light call boxes, surveillance cameras, and smartphone safety Apps, presently deployed at many schools. From this starting point, the MASS system overlays a new generation of mobile devices onto existing security systems—all designed to work together with school safety centers, local police forces, and professional monitoring services to offer a comprehensive solution to the school security problem.

(2) Its particular functionality is achieved when a suite of networked security devices—accessible by one or more cellular phones, typically offered by major service providers with national networks, such as Verizon Wireless, AT&T, and T-Mobile are interconnected throughout an open site, such as school grounds or a college campus, as well as nearby population centers.

(3) In the preferred embodiment, disparate safety devices, which are modular and expandable, sharing data in real time via a graphical user interface, are interconnected to give security personnel enhanced awareness, early warnings, day/night vision, and faster response times during emergencies at both indoor and outdoor premises.

(4) In order to operate the present invention, the MASS personal safety software application, aka App, built on existing emergency notification software and compatible with the Common Alerting Protocol (CAP), an international standard format for crisis alerting, is downloaded onto a school's security server and users' cellular phones. By downloading the software, school administrators and students are connected with security personnel in a unified system for real-time telecommunications among all parties. The MASS App also contains programming hooks to receive inputs from linked devices as well as notifications of security breaches. The MASS system may also be integrated with building security systems, such as but not limited to Wi-Fi Enabled Smart Deadbolts and Ring Alarms and Security Systems. This integration provides security personnel with real time computer vision of ingress, movement, and egress in facilities as well as the capability to automatically lockdown facilities.

(5) In this aspect, the interrelationship of fixed and mobile security devices, integrated with discreet alerting and protective devices, carried by any number of people, substantially departs from conventional concepts and designs of the prior art.

(6) For highest level of efficiency, it merges multiple means of protection into one seamless system whose sum is greater than its parts.

(7) In the preferred embodiment, the present invention includes a means of coordination, communication, and control among various devices through a multilayer virtual network, further integrated with video management software (VMS), and a computer vision system.

(8) For even greater efficiency, it is a further objects of the invention, to provide real-time communication links among all mobile and perimeter connected devices in the school environment, including, but not limited to two portable schoolSAFE devices (one with alerting/notification tools carried by students; the second with alerting as well as defense tools carried by teachers and administrators); security cameras, Blue-light stations, unmanned aerial vehicles, and dynamic robots.

(9) For maximum effectiveness, each device in the MASS system is pre-programmed to respond independently to an emergency or threat in its field of use. It simultaneously shares its findings with all other devices in the MASS network. These devices, including but not limited to security cameras, UAVs, drones, and robots may be equipped with daytime/nighttime IR cameras and listening devices, as well as computer-based vision tracking and machine learning algorithms.

(10) The combination of such AI technologies, as are well known in the industry, may include predictive policing, audio/and forensic voice and gunfire detection sensors, along with other security procedures, The technologies make it possible to quickly find, identify, follow, confront, and apprehend offenders, day or night, even when their presence is obscured by foliage, camouflage, shadows, and other obstructions.

(11) In the first aspect of the invention, the MASS system integrates two portable electronic schoolSAFE devices, identified herein for descriptive purposes as follows:
1. Personal Safety Device #1 (a low cost safety device available commercially from multiple vendors, including Silent Beacon (https://silentbeacon.com; BBGuarder (https://www.bbiessentials.com) and others.
2. Personal Safety Device #2 (a personal safety technology patented by the applicant as U.S. Pat. No. 9,615,235, Wireless Personal Safety Device, Apr. 4, 2017, and U.S. Pat. No. 9,715,805, Wireless Personal Safety Device, Jul. 25, 2017, both of which are incorporated herein by reference.)

These lightweight devices, can be worn, mounted, or carried by any number of users. Activation of their alarms are triggered by voice command, pull of a pin, or tap of a button.

(12) Personal Safety Device #1

In an emergency, a single tap on the device's button, voice command, or equivalent activation triggers instant high-intensity acoustic and visual alarms.

If the situation warrants, a double tap, voice command or equivalent activation sends silent notifications to emergency contacts and authorities. The device is further wirelessly connected via a Bluetooth protocol to each user's cellphone, which is running the MASS safety App. Among other features, the App pinpoints a user's GPS location, both on and off campus, requests help from networked authorities as well as each user's pre-set personal contacts. It also provides timely information to all parties in the network. Simultaneously, it records and transmits audio/video recordings, no matter where a student or teachers may be located—on and off school grounds. It may also alert a professional monitoring service, tasked with responding to and monitoring an emergency until resolved.

(13) Personal Safety Device #2

Upon activation, Personal Safety Device #2 similarly sounds and emits alarms plus activates defensive measures.

It has been further designed to be a front-line defensive tool for confronting an assailant or intruder, intent on doing harm to students, staff, and/or attendees at an event. Besides being unobtrusively worn or carried in a purse or pocket, it may be securely stored in a desk or other easily accessible container. In addition to communicating with the MASS system, its non-lethal defensive measures may include, but are not limited to, a flashing strobe light, an explosive dye pack, a chemical spray, a shocking mechanism, and other known deterrent measures— all designed to ward off and disrupt would-be attackers. Importantly, Personal Safety Device #2 is not limited by cellphone data dropout or lost communications. When activated, it transmits a signal that can be received by a Wi-Fi Network or detected worldwide by the international satellite system, Cospas-Sarsat. From there, communications with pre-programmed local emergency authorities and a professional monitoring service are enabled.

(14) Security Camera

In another aspect of the invention, the MASS safety system is integrated with one or more security cameras, operable day or night, which record and store video footage for retrieval, analysis, and evidence in response to notifications from Personal Safety Devices #1, or #2, and/or security officials. Triggering may also be accomplished by any number of detectors, as are well known in the industry, including but not limited to motion, gunfire, glass breakage, and intrusion indicators, ultrasonic, tomographic, and microwave sensors, active and passive IR (PIR) sensors, and other means of detecting criminal activity or property intrusion and damage. The camera system may also be integrated with a real-time video software, allowing security officials to confront wrongdoers by triggering loudspeaker announcements, as well as high-intensity lights and sirens. Security operators may also message cellphone users, running the MASS safety App, who are in the general vicinity of the perceived threat or incident. Where allowable by law, security camera integration may also employ facial recognition software, especially in emergencies, provided legal authority is first obtained. When properly vetted, facial recognition systems can play a positive role in identifying people in photos or videos to corroborate other forms of evidence of criminal activity.

(15) Un-manned Aerial Vehicle

In another aspect of the invention, the MASS safety system is integrated with security measures mounted on a unmanned aerial vehicle (UAV), aka a drone.

Drone technology that meets school safety requirements is the assignee's U.S. Pat. No. 9,589,448, Autonomous Safety and Security Device on an Unmanned Platform Under Command and Control of a Cellular Phone, Mar. 7, 2017, which is incorporated herein by reference.

(16) It is configured to provide a pre-programmed, 24/7 means to autonomously monitor and patrol indoor and outdoor premises, assess emergency situations in real time, and secure perimeters. In school settings, it can further act as an "Eye in the Sky," providing local area reconnaissance with its onboard cameras and sensors. Besides airborne area security, it provides indoor monitoring when tethered to its docking station, which also functions to recharge the UAV's batteries and allow wired communications with outside parties. The docking station may also augment the overall coverage provided by sensors hard mounted on perimeter doors, walls, and windows. Whether indoors or outdoors, the UAV is programmed to autonomously, or under operator control, follow, hover, or circle, above or near a target, such as a person with criminal intent or a threatening animal.

(17) The combination of the MASS network's two-way communication connection, integrated with the UAV's radio receiver and AI technologies, enable the UAV to autonomously, or as directed by security personnel, to activate any number of monitoring and protective devices, as are well known to purveyors of UAV technology. These may include but are not limited to alarm and visual warning instruments, area illumination, buzzing/frightening maneuvers to thwart criminal activity, discharging a shocking mechanism, and aiming a directional nozzle for spraying substances, such as pepper spray or tear gas, to temporarily blind an assailant. It may also include, where allowable by law, one or more stronger means of disabling an assailant. It may further include a means to communicate directly with other networked UAVs, as well as emergency responders, while simultaneously providing live streaming video to security personnel for deterrence purposes. The UAV may include means for monitoring various onboard capabilities such as, for example, checking of the level of the spraying substance and the level of charge of the UAV's batteries. These levels must be monitored during operations to ensure availability of sufficient spray and voltage available for use. Additionally, security personnel can monitor the strength of signal between the UAV and the associated cell phones to make sure that signals sent by the personal safety device may be effectively received by the UAV.

(18) Besides its video, audio, flashing and alarm, defensive capabilities, the UAV may also be programmed to respond in real time to notifications from the MASS Safety Apps personal safety devices, Personal safety Devices #1 and/or #2, described above, as well as motion detectors, IR video, accelerometers, glass breakage, and similar sensors, as are well known by purveyors of home-security systems.

(19) In order to operate the present invention's UAV, it may be operated autonomously by security officials or it may be integrated into the MASS Safety software application. The important aspect is that command, control and communication link with the aerial platform preferably be professionally operated and its findings made available to all parties in the MASS with a need to know. Among other things, security personnel at a school safety/emergency center may implement multiple UAV software options such as: auto takeoff and landing, activation of automatic "follow-me" with obstacle sensing and avoidance controls, real-time two-way video communications, switches for solar charging batteries, and other useful functions, which are being deployed rapidly in the burgeoning UAV marketplace. To maximize overall system bandwidth, such functions may or may not be fully integrated into the MASS system.

(20) The UAV command and communications link, whether received on a UAV or at its docking station may also be provided with an autonomous panic switch that, when activated communicates with any number of cell phones running the MASS Safety App via a radio link, Bluetooth, or other communication methods as may become available.

(21) For greater efficiency, the present invention contemplates an optical camera on the UAV or at its docking station. When integrated with optical recognition software, it can communicate its imaging to security personnel. Programming allows the UAV's camera to "follow and track" targets. Forensic software further allows it to differentiate assailants from shadows, vegetation, bystanders etc. After identifying a potential assailant(s), the system can notify people in the vicinity, who are running the MASS Safety app on their cell phones, of a particular threat or emergency situation before an attack occurs. When the UAV's computer vision system detects a suspicious person or criminal act, it sends a signal to a controller that transmits imagery to the system's video management software (VMS) running on a computer server monitored by security personnel.

(22) For maximum efficiency, the UAV's indoor capabilities are enabled to navigate a route, check for criminal or mischievous intent, such as intruders, broken windows, and doors that are ajar. It can also monitor an area from a fixed home base. Outdoors it can secure the perimeter of a property, check for vandals or uninvited guests. It can also be used as a "scarecrow" to frighten off birds or wild animals from a property, such as a building or vehicle. Tethering the UAV to its docking stations ensures that it is always ready for powered flight and wired communications without outside parties and devices.

Robot

In another aspect of the invention, the MASS system is integrated with safety and security apparatus mounted on a dynamic robot.

Operating independently from the UAV, its role is to provide another pre-programmed 24/7 means to autonomously surveil, patrol, or encircle a target, both indoors and outdoors, assess emergency situations in real time, and secure perimeters. Functionality is active whether the robot is mobile or tethered to its docking station. Currently, police and fire departments throughout the USA are using robots to gain remote visibility in potentially dangerous situations. This technology is readily available for deployment in violent confrontations, such as active shooter crises. By remotely assessing a scene before taking action, security police can make more informed decisions that reduce risk, improve safety, and de-escalate conflict.

As is well known in art, the robot may be controlled by a human operator through a virtual interface using web-based control software and a sensorized suit. Such capabilities have been implemented in security robots, such as Spot, developed by Boston Dynamics, as well as other robotic-control companies.

For greater efficiency, the robot is programmed and equipped with cameras, x-ray devices, and appendages that enable security personnel to safely inspect premises, especially in dangerous situations, and pinpoint the location of assailants, vandals, and active shooters.

The maximum efficiency, the robot is further be equipped with audio and visual alarms, a shocking mechanism, and a chemical sprayer for self-defense. These may include pepper spray, tear gas, and high-intensity illumination of the area for temporarily blinding an assailant. It may also include, where allowable by law, one or more other means for disabling an assailant. It may further include a means to communicate directly with emergency responders as well as autonomously providing live streaming video for deterrence purposes. When attached to its recharging docking station, it may also provide a wireless, indoor premises monitoring system without the necessity of hard mounting sensors on perimeter doors, walls, and windows. It may also leave its docking station to provide reconnaissance, as guided by security personnel.

Robot deployment may also be triggered by motion detectors, cameras, glass breakage, gunfire detection and similar sensors, well known by purveyors of home-security systems. Such robots can also provide deterrence by activating its alarms and deterrent tools to disrupt the actions of criminals, mischief makers and nuisance wildlife.

It is a further object of the present invention to provide unified command and control structure that extends the capabilities of existing third-party Blue-Light stations, surveillance cameras, UAVs, safety robots, and personal safety Apps running on cellphones by overcoming gaps in visual coverage, lack of situational awareness, and slow response times.

In these respects, the combination and interconnectivity of multiple safety/security devices, according to the present invention, substantially departs from the conventional concepts and designs of the prior art, which typically rely on independent sensors, devices, and communication mechanisms.

Through use of the present invention, people in the invention's proscribed area, such as a school or campus setting, may feel secure knowing that multiple, automated systems are working 24/7 to provide a security dome over their surroundings.

These and other objects, aspects and features of the present invention will be better understood from the following detailed description of the preferred embodiment when read in conjunction with the appended drawing figures.

As noted above, the MASS system is modular; not every aspect need be deployed to create and maintain a safe and secure environment. Implementation will vary by school, environment, and public safety requirements.

DETAILED DESCRIPTION

This disclosure is further described in the following comprehensive description with drawing references.

The basic functionality of the Multi-tiered Awareness and Safety System (MASS) consists of multiple electronic detection and imaging resources, integrated in real time, to assist security personnel and at-risk people in identifying, avoiding, and responding to threats to students and school property.

Figure 1:
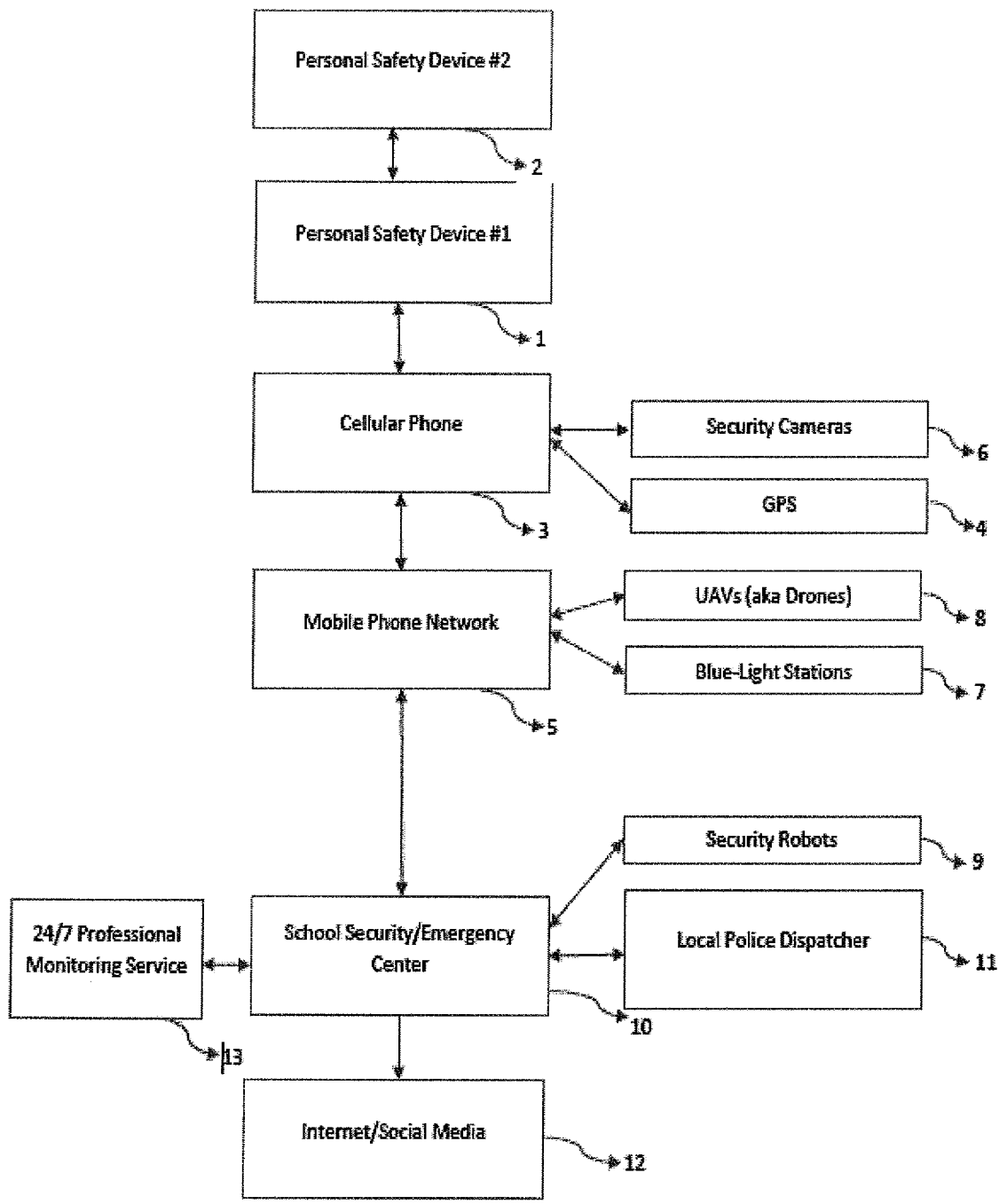
FIG. 1 is a schematic representation of the main components of the Multi-tiered Awareness and Safety System (MASS).

FIG. 1 presents the key components of the Multi-tiered Awareness and Safety System (MASS) invention. It consists of multiple mobile safety and defense devices 1, 2, 8, 9, and multiple fixed security devices 6, 7 all combined into a unified system. The fixed security devices 6, 7 are strategically located within a pre-defined or designated perimeter. The mobile safety and defense devices 1, 2, 8, 9 may freely move with people and instruments, within and outside of the school perimeter. All are interconnected by a secure local area network 5 to one another, to a school safety/emergency response center 10, to a nearby local police dispatcher 11, to social media sites 12, and optionally to a professional monitoring service 13. Tiers are modular and expandable. It should not be construed that all devices are required to provide optimal protection and rapid response.

Also in FIG. 1, we delve further into key components of the MASS invention. Six networked tiers are presented: portable electronic devices 1, carried by primarily by students; portable electronic device with onboard defense tools 2, carried primarily by administrators, teachers, and school officials; security cameras 6, mounted on structures 7; unmanned aerial vehicles 8; and mobile security robots 9. These devices are networked with a school security/emergency response office 10; a local police dispatcher 11; and a professional monitoring service 13. Depending on a school or venue's specific security requirements, the system can be deployed with a greater or lesser number of tiers. Portable versions of the MASS system may also be configured and deployed at venues serving large groups of people, such as concerts, rallies, and political events.

FIG. 1 further depicts other components of the MASS invention. These are cellular phones 3 which contain an internal Global Positioning System (GPS) 4 that provides location information of the cellular phone, and presumably the person carrying it. The cellular phone 3 communicates over a cellular phone network 5 to provide interconnectedness to the devices in the phone network and the Internet 12. The phone network 5 allows users to summon help over the phone network by calling school security 10, local police dispatcher 11 through the 911system, a professional monitoring service 13, and pre-set emergency cellphone numbers of students, family members, friends, colleagues, and school officials. The Internet 12 also has linkages to various social media for summoning help over online platforms such as Instagram, Facebook, and Twitter etc.

Figure 2:
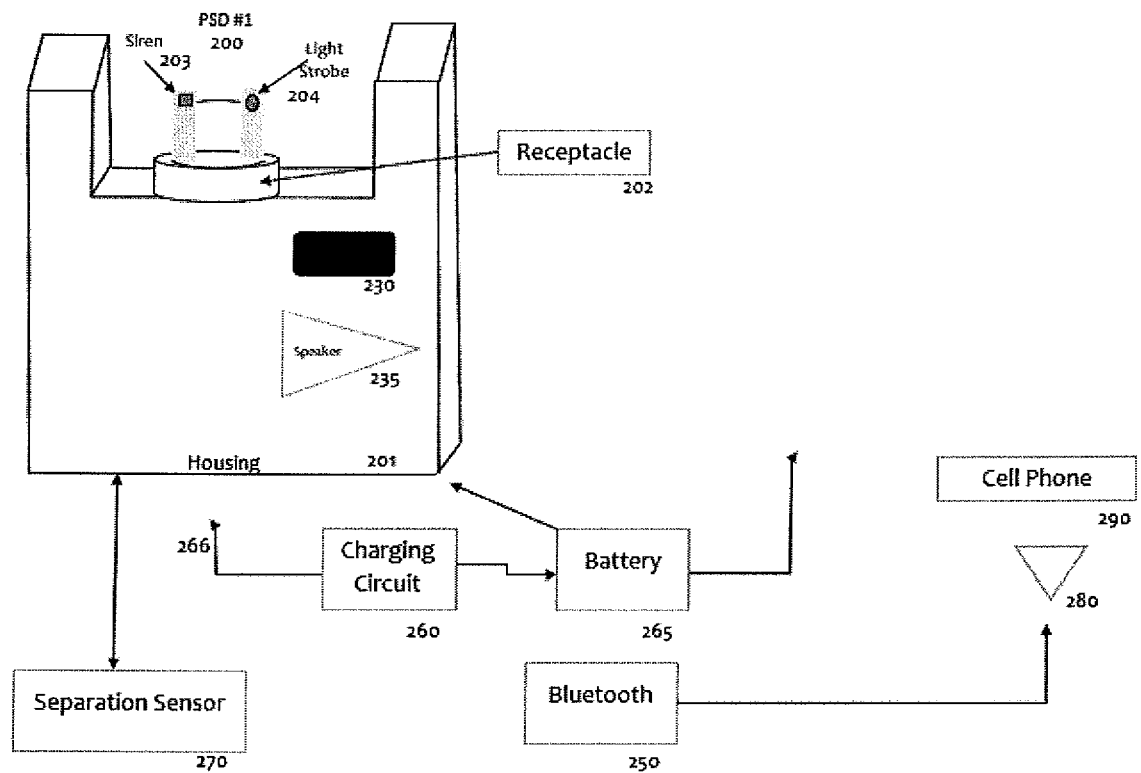
FIG. 2 presents a block diagram of the personal safety device (PSD #1), typically carried by students.

FIG. 2 presents the personal safety device (PSD #1) 200, which is a commercially available small pendant from multiple sources, as identified in this application's summary. The PSD #1 may also be supplemented by deployment of such panic buttons as RFID Guard with emergency call buttons. These devices are typically carried by students. RFIDs may also be embedded in or on desks or other easily accessible structures. The PSD #1's circuitry is miniaturized for ease of conveyance and contains alert mechanisms, such as a high and/or low-pitched siren 203 and optionally a strobe light 204 to disrupt an attack or discourage a would-be attacker. The PSD #1 is tethered to a cellular phone 290, over a Bluetooth wireless connection 250. Once integrated with the MASS network, carriers of PSD #1 may communicate directly with the school security office 10, a local police dispatch center 11, a professional monitoring service 13, and pre-selected emergency contacts.

Referring now to the invention in more detail, in FIG. 2 we show a block diagram of the PSD #1. Its housing 201 contains a receptacle 202 for a siren 203 and a strobe light 204, along with a power source 230, and a speaker 235 for generating a high-intensity audio alarm. Block 260 is a charging circuit that allows the PSD #1's battery 265 to be charged for use. The input to this charging circuit can be, for example, sourced from a wall mounted transformer, a USB cable, or a charging pad. The input source depends on the design of charging circuit 260. As is well known in the art, this can take on numerous forms, such as an AC-DC converter using a direct or transformer coupled AC input, or a DC regulation using an unregulated DC input. Battery 265 must be lightweight and easily rechargeable. Preferably, it uses a lead-acid, nickel cadmium (NiCd), nickel metal hydride (NiMH), lithium ion (Li-ion), or lithium ion polymer (Li-ion polymer) technology, as is known in the art. Battery 265 can also be a non-chargeable type, eliminating the need for charging circuit 260. Battery 265 is used to power the Bluetooth circuitry 250. Switch 266 is used to enable or disable the powering of the Bluetooth 250. Its antenna 280 facilitates transmission of wireless signals from the PSD to a carrier's cellular telephone 290. A separation sensor 270 senses PSD #1's distance from the said cellular phone 290 by measuring signal strength. If signal strength dips below a pre-set threshold, an alarm is sent to the cell phone.

Figure 3:
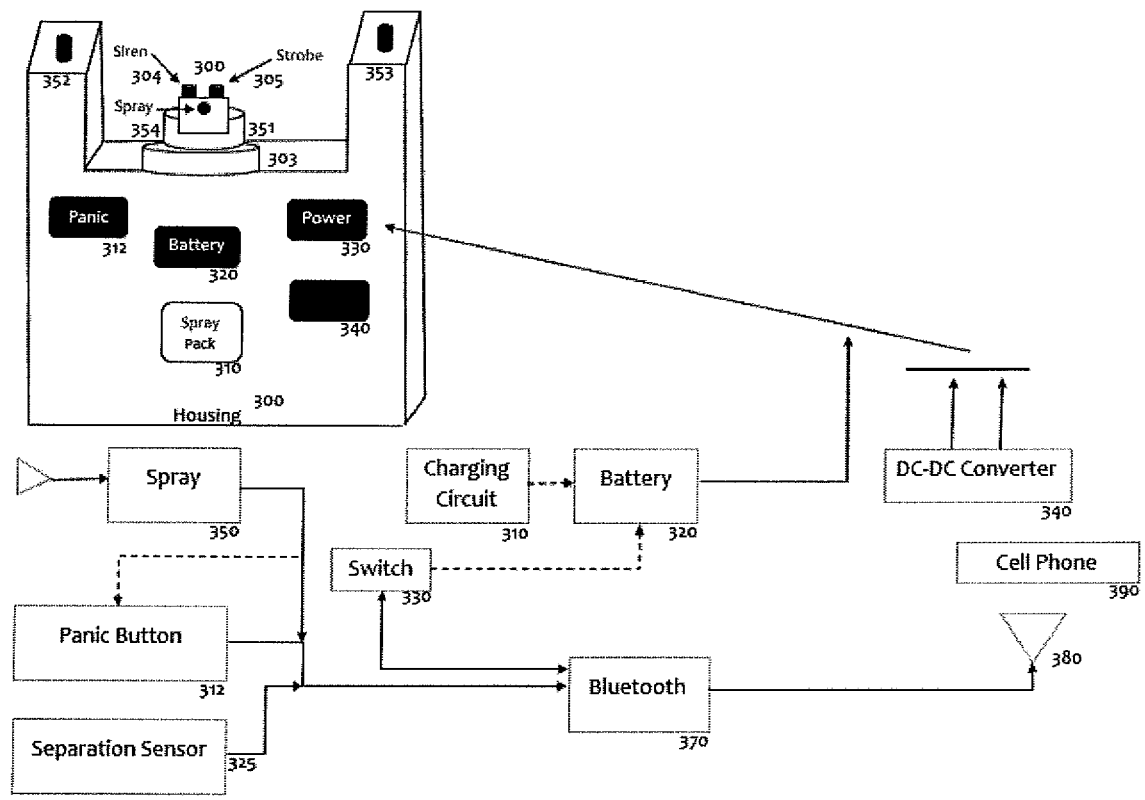
FIG. 3, presents a block diagram 3 of the Personal Safety Device (PSD #2), typically carried by school teachers, officials, and administrators.

In FIG. 3, we show a block diagram 300 of the Personal Safety Device (PSD) #2. A detailed description of PSD #2 is disclosed in U.S. Pat. Nos. 9,715,805 B1 and 9,615,235 B2, owned by assignee, and incorporated herein by reference. Its circuitry is miniaturized for ease of conveyance and contains alerting mechanisms to signal a security threat as well as self-defense mechanisms to non-lethally disrupt an attack. PSD #2 has a housing 300 that contains a front-end receptacle 303 or other mounting structure for holding a siren 304; a strobe light 305, along with a power source 330, and speaker 340 for generating the high-intensity siren; two shocking electrodes 352 and 353 for stunning an assailant; and a nozzle 354 for spraying chemical agents. The housing may also include, but is not limited to a receptacle for a pepper spray package 310 or other equivalent noxious chemical packet, which can be loaded into the PSD #2.

Power Source 330 includes a power on/off switch, which can be either a mechanical or software-based switch. It also enables the PSD #2's Bluetooth functionality. Block 310 is a charging circuit that allows the PSD #2's battery 320 to be charged for use. The input to this charging circuit can be sourced, for example, from a wall-mounted transformer, a USB cable or a charging pad. The input source will depend on the design of charging circuit 310. As is well known in the art, this can take on numerous forms, such as but not limited to an AC-DC converter using a direct or a transformer coupled AC input, DC regulation using an unregulated DC input, etc. Battery 320 is a rechargeable type battery, preferably using lead-acid, nickel cadmium (NiCd), nickel metal hydride (NiMH), lithium ion (Li-ion), or lithium ion polymer (Li-ion polymer) technology, as is known in the art. Battery 320 can also be a non-chargeable type, eliminating the need for charging circuit 310. Whichever battery is used, it must be sized appropriately. Battery 320 is used to power the Bluetooth circuitry 370 and the DC-DC converter 340 that converts the low battery voltage to a high voltage potential across electrodes 352 and 353 for shocking. Switch 330 is used to enable or disable the powering of the wireless communication device 370 and the DC-DC converter 340, respectively. PSD #2 is tethered to a cellular phone 390, over a wireless communication device wireless connection 370. The antenna 380 facilitates transmission of wireless signals from PSD #2 to a carrier's cellular telephone 390. A separation sensor 325 measures distance of PSD #2 from the associated cellular phone by measuring signal strength. If signal strength dips below a pre-set threshold, an alarm is sent to the cell phone.

Pre-packaged units of spray 310 are available commercially. Alternatively, a custom version of the contained spray may be employed that integrates specifically with the PSD #2. An example of a custom-packaged spray is one in which the spray activation switch 350 on the contained spray is designed to also engage the panic button switch 312. In this way, activation of the spray via nozzle 354 indicates an emergency situation, alleviating the need for two separate actions. This can be instrumented mechanically, or through another sensing modality, such as optical or capacitive sensing, as is known in the art. Block 330 shows a power on/off switch and can be either a mechanical or software based switch and enables the PSD #2's Bluetooth functionality. PSD #2 may also house circuitry and component of a stun gun. A description of a stun gun is disclosed in U.S. Pat. No. 4,688,140, incorporated herein by reference. Electrodes 352 and 353 are designed to be placed against a perpetrator's skin or fired through the air for disablement. Alternatively, where allowed by law, a more lethal defense mechanism may be here mounted for activation.

Figure 4A:
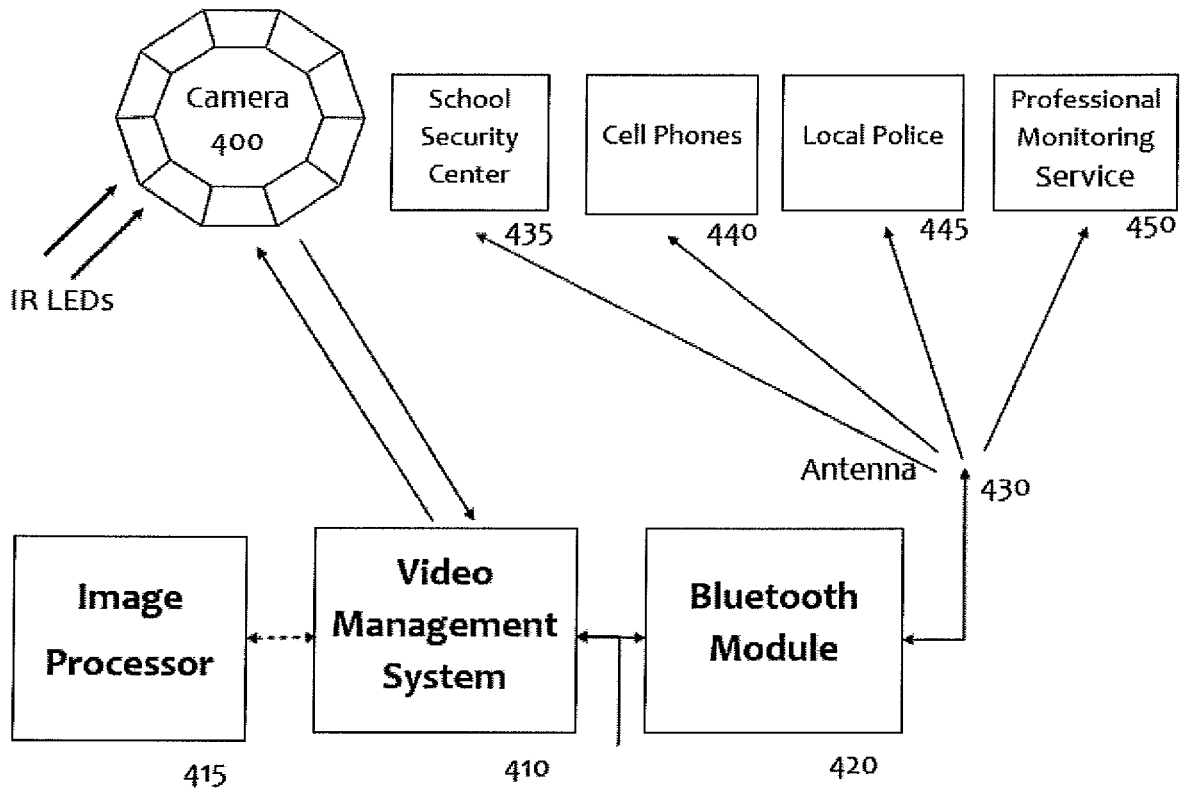
FIG. 4A presents a block diagram of the security camera integrated into the MASS system.
Figure 4B:
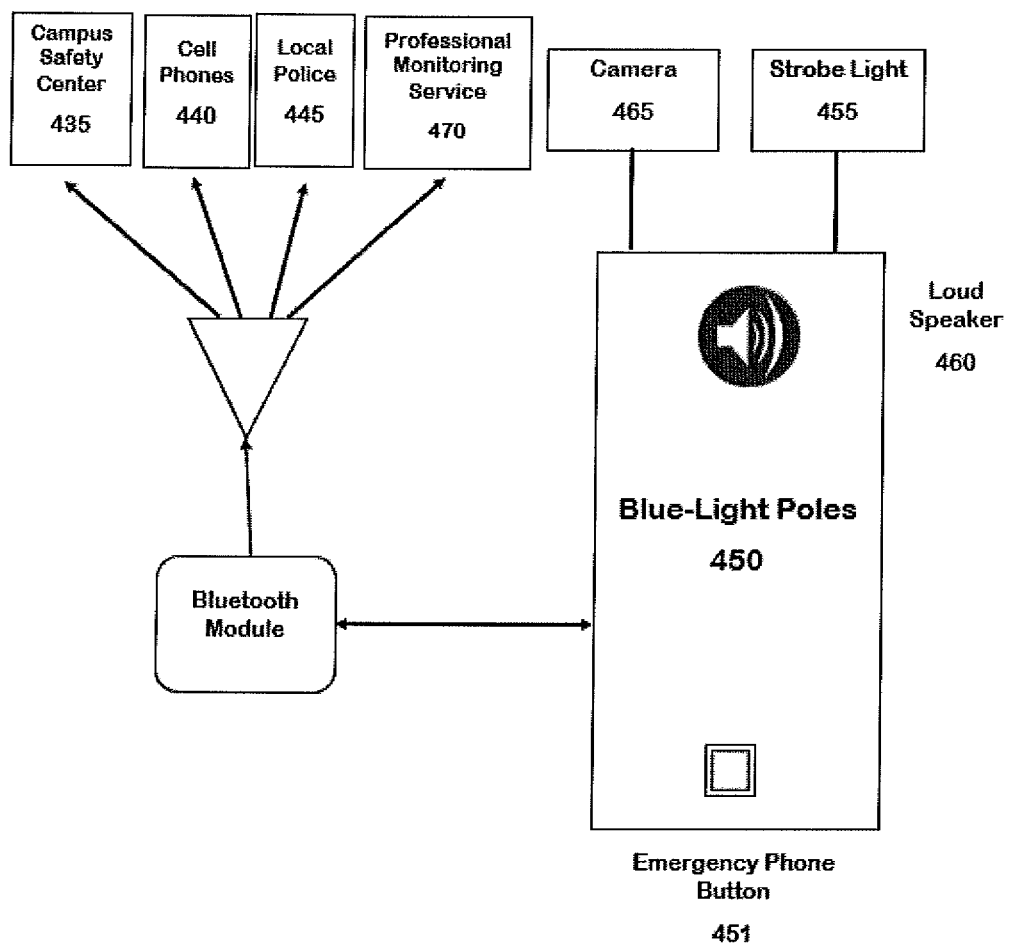
FIG. 4B presents a block diagram of the Blue-light station integrated into the MASS system.

Referring now to the invention in more detail, in FIGS. 4A and 4B we show block diagrams of two additional tiers in the MASS system. These are two static security devices, the security camera(s) 400 and Blue-light station(s) 450. Both the camera and Blue-light station are self-contained modules, typically installed at appropriate locations throughout school facilities and grounds, as is known in the art. It should be noted that many schools (K-12) have installed security cameras. At the college level, a majority schools have also installed Blue-light stations.

With further reference to FIG. 4A, we show the security camera(s) 400. Its video outputs can be integrated with a video management system 410, such as presently available from Ava Security Solutions and other commercial sources. These companies offer intelligent surveillance systems, which analyze video footage in real time to include image recognition, abnormal human behavior, identification of specific sound patterns, such as screaming, gunfire, breaking glass etc. In particular, surveillance video data from the camera 400, suitably processed by an image processor 415, can be sent to a Bluetooth module 420, where it is wirelessly transmitted 430 with appropriate notifications to parties in the MASS safety network, including, but not limited to the school's public safety/emergency center 435, school networked cellular phones 440, and, as appropriate, a local police dispatcher 445, and a professional monitoring service 450. In this way, camera video links can be made available for instant notifications of suspicious activity, assaults, and vandalism to all parties in the MASS system. Additional, as required, camera 400 may be configured with a high intensity light and a high decibel siren that activates if a person loiters too long or suspiciously on property or near buildings, or is observed initiating or undertaking criminal activity in the proscribed perimeter. In appropriate circumstances, such as where a school is located in an area where cell service is less than optimal, the antenna 430 may include a portable cell tower installable on school grounds and able to communicate with nearest permanently installed cell towers in a local cellular network.

Referring now to Block 415 of FIG. 4A, the camera's image processor may implement a people detection algorithm, as described in "Background Subtraction for Freely Moving Cameras," incorporated herein. The method operates entirely using 2D video image measurements without requiring an explicit 3D reconstruction of the scene. A sparse model of background is built by robustly estimating a compact trajectory basis from trajectories of salient features across the video, and the background is 'subtracted' by removing trajectories that lie within the space spanned by the basis. Foreground and background appearance models are then built. From this data, an optimal pixel-wise foreground/background labeling is obtained. Other people tracking algorithms are available, as understood by those skilled in the art, such as one described in "People Tracking via a Modified CAMSHIFT Algorithm," also incorporated herein. This, in turn, makes use of OpenCV, an open source computer vision library, also incorporated herein, to supply an implementation of the Gaussian Mixture Model. The Gaussian Mixture Model similarly performs background subtraction. Background subtraction involves calculating a reference image, subtracting each new frame from this image and thresholding the result. The result is a binary segmentation of the image, which highlights regions of non-stationary objects, such as movement of humans and animals. Shadows are also removed in this block. There are many other ways to perform the same function as blocks 415, including, where authorized, the use of facial recognition instead of people recognition. Facial recognition can be found in open CV, Facereclib (https://pypi.python.org/pypi/facereclib), http://www.face-rec.org/algorithms/and commercial facial recognition software (http://www.luxand.com/facesdk/). Facial recognition software can be programmed with images of enrollees in nearby sex offender registries as well as of paroled violent felons and others who might possibly attack a school so that if such a person is detected near the school campus, appropriate notification to authorities can occur.

The images transmitted to Block 415 may also be processed using an optical flow method such as the Lucas-Kanade Algorithm. This algorithm is a widely used differential method for optical-flow estimation, a version of which can be found in open CV. It assumes that the flow is essentially constant in a local neighborhood of the pixel under consideration, and solves the basic optical-flow equations for all the pixels in that neighborhood using a least squares criterion. By combining information from several nearby pixels, the Lucas-Kanade method can often overcome vagaries of the optical-flow equation. Other motion detection algorithms can be used, as is known in the art, such as found at http://blog.cethic.ws/opencv-simple-motion-detection.

Human recognition processing can also be initiated for imagery obtained from cameras mounted on other devices in the MASS system, including, but not limited to UAVs 8 and Security Robots 9, identified in FIG. 1.

With further reference to FIG. 4B, we show the Blue-light pole 450, integrated with the MASS system. Blue-light stations typically contain an emergency phone button 451, activated by pressing its switch on the pole's front panel. If the station is equipped with a high-intensity strobe light 455 at the top of the phone pole, it will be simultaneously activated, providing a highly visible signal for the police, first responders, and nearby bystanders, as well as alerting all parties that a person is in need of assistance. The pole may also contain a loudspeaker 460 for public-address messages.

The button press 451 automatically calls devices in the MASS system, as well as but not limited to the public safety office 435, networked cellular phones 440, and, as appropriate, the local police dispatcher 445, and the professional monitoring service 470. Calls may be placed through traditional landlines or, where feasible, via a wireless Bluetooth transmission protocol. Integration into the MASS safety system can also help deter prank and nuisance calls by integrating a security cameras 465 atop Blue-light pole. It can be configured to contain a processor-enabled software module that captures an image of a caller for identification purposes. Integration of the existing Blue-light poles with the MASS system further allows security personnel and professional monitoring reps to quickly identify particular Blue-lights pole by number and location. In this way, each Blue-light pole's security camera 465, supported by video imagery, may display imagery on monitors of school public safety/emergency office 435, the local police dispatch center 445, the professional monitoring service 470, and nearby cellular phones 440 in the MASS network. The MASS network further allows a person in distress to communicate directly with the public safety office 435, local police dispatcher 445, and cell phones in the immediate vicinity of an incident. If the Blue-light station is equipped with a PA system 460, public safety officers 435 may communicate authoritatively with people, including a potential or actual assailant, in the immediate vicinity of a reported incident.

Figure 5:
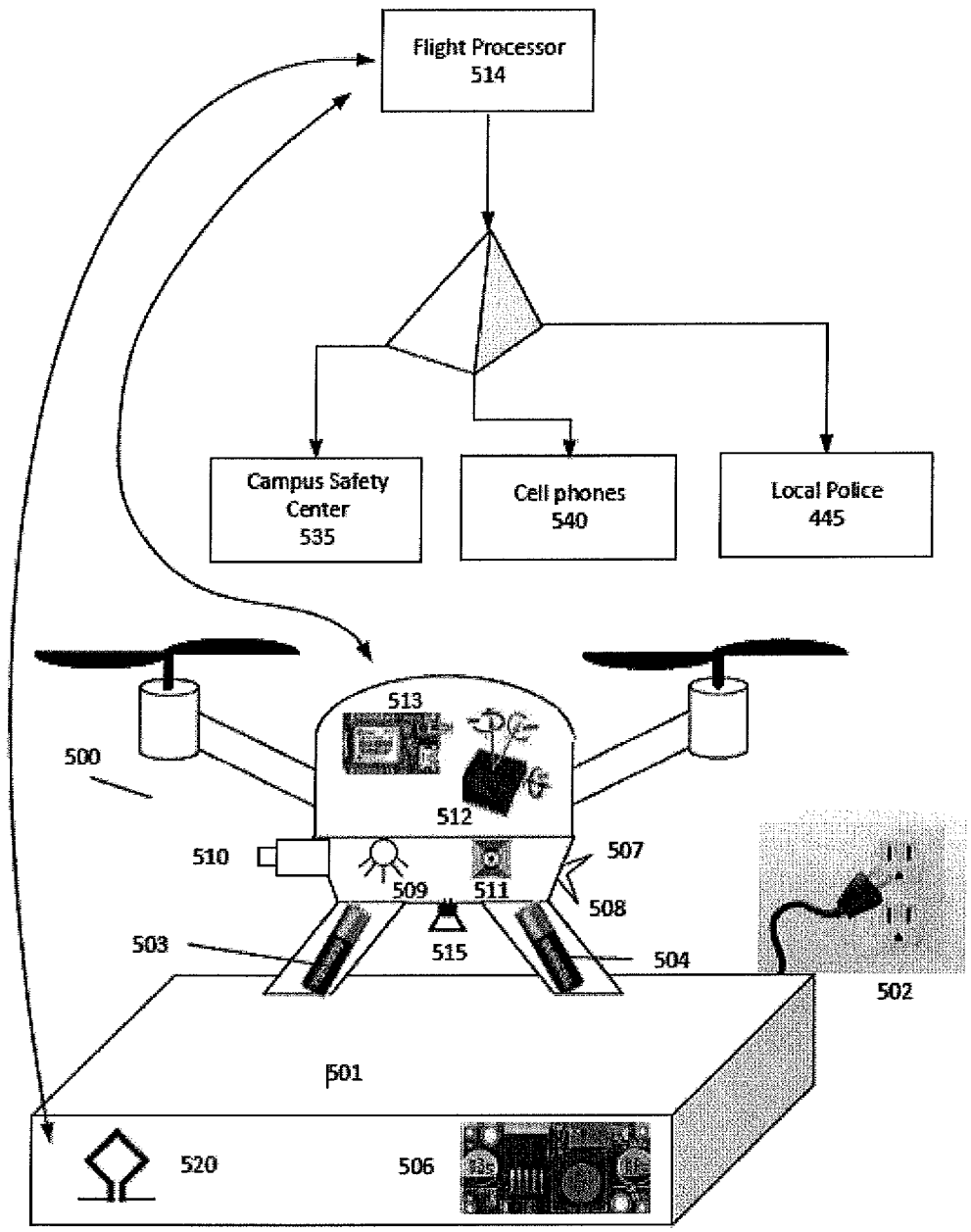
FIG. 5 presents the MASS system's unmanned aerial vehicle, configured for either indoor or outdoor operations.

In FIG. 5, we show the MASS system's unmanned aerial vehicle (UAV) 500, which is configured for either indoor or outdoor operations. A detailed description of one such UAV is disclosed in U.S. Pat. No. 9,589,448 B1, previously granted to the applicant, and incorporated herein by reference. It describes both untethered and tethered means of flight. When not airborne, the UAV sits on a docking base 501, which may include an inductive or mechanical charging mechanism. Either will allows its batteries #1 and #2, 503 and 504, to be charged upon landing in a manner similar to iRobot Roomba® docking and recharging principles, as are known in the art. The UAV platform—as well as its charging/home base— may also contain multiple peripherals, such as ultrasonic motion and gunfire detectors, thermal and glass breakage detectors, extra cameras, vibration sensors, and other devices, as are typically deployed in home and building security systems. Sensed data is transmitted to the UAV's processor 506, which may be configured to transmit data to the charging/home base station, once coded in an open source manner. Alternatively, they may connect to the UAV's flight processor 513 via an appropriate interface 515, such as Bluetooth, USB, or Ethernet.

Battery #2, 504 is used to power block 505 in the docking station 501. It contains the DC-DC converter 506 that converts the low battery voltage to an onboard charging cube capable of delivering high voltage potential across electrodes 507 and 508 for delivering non-lethal stunning. A description of a stun gun is disclosed in U.S. Pat. No. 4,688,140, incorporated herein by reference.

The energy stored in a battery #2 504 powers such defensive devices as a shocking mechanism 507 and 508 and a chemical spray mechanism 509 and/or other disabling weaponry to subdue or discourage a would-be attacker, vandal or animal. It also contains a camera 510 and a high intensity light 511. Image data from the onboard camera 510 is suitably processed by the UAV's flight processors 514 for use in navigation, assailant determination and defensive actions. This data is also transmitted 520 to a digital data link or Bluetooth module transmission to the school public safety office 435 for further image processing, analysis and control of the UAV. Cell phones 540 in the MASS system may also be notified as appropriate. The UAV's light 511 can be used to illuminate or follow a target on the ground, within a building, or to show public safety officers the GPS location of the UAV 500 and the target it may be monitoring or following. Multiple following techniques, as our known in the art, may also be applied, such as those in the AirDog product line (https://www.airdog.com). Examples of drone control for interior surveillance can be found among the various drone manufacturers, for example Parrot (http://ardrone2.parrot.com/). Under public-safety personnel control, the UAV can make surveillance runs throughout the premises, flying a fixed, random or learned path as required. Navigation is again performed optically in conjunction with the IMU 512. Beacons for navigation may also be used as are known in the art. Multiple UAVs can be utilized to cover a larger volume or to take turns between battery charges. When its battery 503 is low, the UAV's flight processor 514 navigates the UAV to its inductive charging/home base station 501 for charging, in a manner similar to honing is implemented in robotic lawnmowers and vacuums. Operationally, the UAV 500 may further transmit videos of the indoor and outdoor premises. These images may be further processed for real-time searching for vandals who might "tag" or damage the building, or for burglars who might be seeking unauthorized entry. When an offender is found or detected, public safety personnel are now further equipped with tools, such as spray 509, light 511, sound 515 and stunning mechanisms 507/508 to deter and/or disable an assailant or vandal.

The UAV's light 511 may also be used to illuminate a possible assailant or to flash a warning signal. Multiple lights or strobe flashes of variable intensity may be further deployed to temporarily blind the assailant, and/or provide ample time for an intended victim to escape. The electric shock device, such as a stun gun or taser, typically contains two electrodes 507 and 508.

Block 515 is a speaker or other such sound generator capable of being turned on via the embedded flight processor 514. It can provide a loud warning to a possible assailant, or broadcast a prerecorded message, such as a notification that authorities have been contacted.

Also, as is known in the art, the UAV contains an inertial measurement unit 512 for keeping the aerial platform stable and level in the sky and a GPS receiver 513 for knowing the UAVs' precise location. The UAV flight processor 514 controls these and all other command and control functions of the UAV. Other flight management and operational parameters, including sensors for guidance, identification and deterrence may be incorporated, as are well known in the art. Additional examples of drone control can be found among the documentation of many drone manufacturers, for example Parrot (http://ardrone2.parrot.com/).

Figure 6:
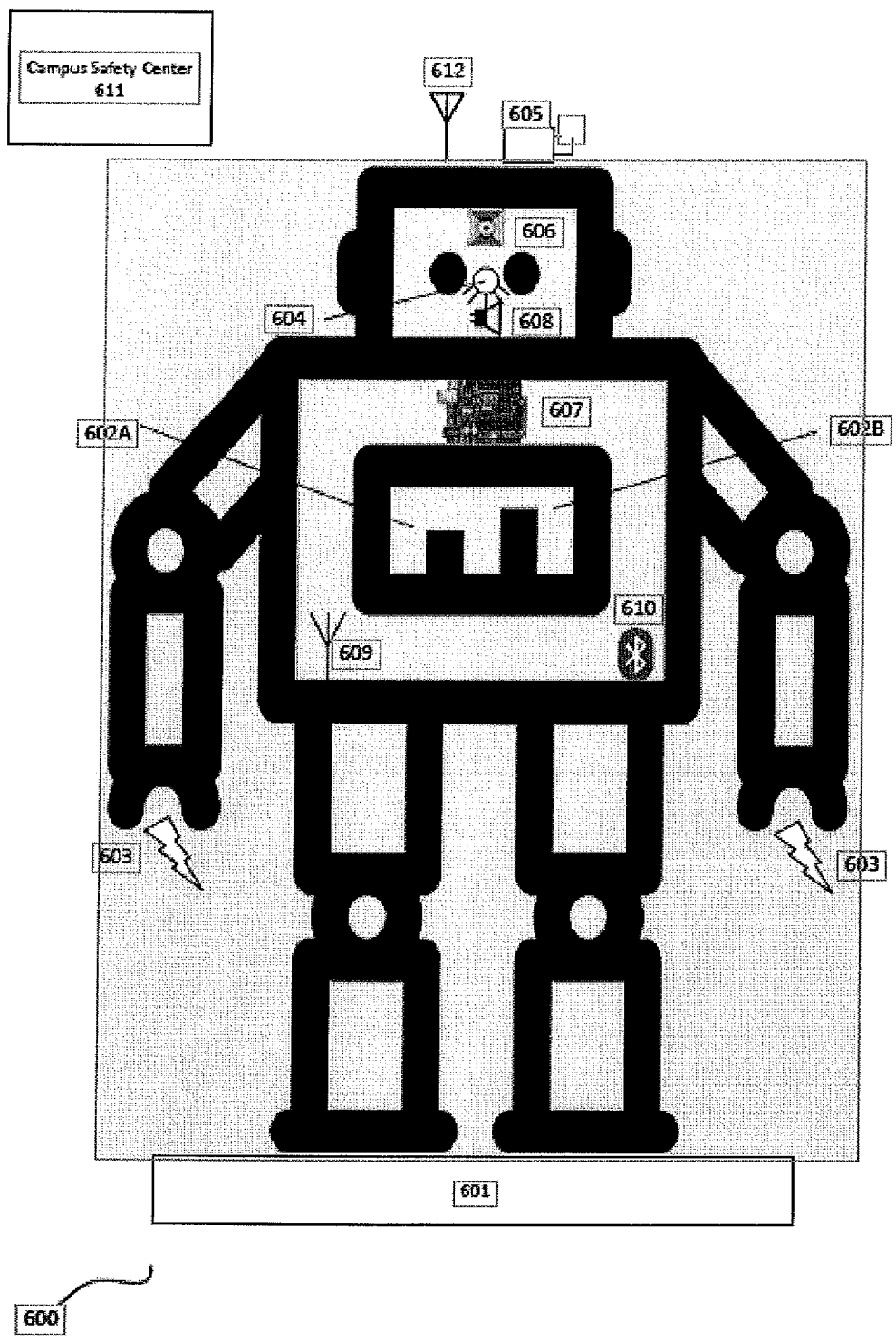
FIG. 6 presents the MASS system's mobile robot, configurable for either indoor or outdoor operations.

In FIG. 6, we show the MASS system's mobile robot 600, which may be configured for either indoor or outdoor operations and equipped with detectors and sensors, as described above in UAV operations. Performance is likewise similar to the MASS system's UAV, but restricted to terrestrial and structural use. (It does not fly or hover.) When not in use, the robot is latched to a docking base 601, which may include an inductive or electrical charging station. Either will allow its batteries 602 A and 602 B to be charged at its docking station. Charging occurs in a manner similar to iRobot Roomba® docking and recharging principles, as are known in the art.

The energy stored in the robot's battery 602 B powers defense mechanisms, such as a shocking mechanism 603, a spray mechanism 604, and/or other disabling weaponry to subdue or discourage a would-be attacker. It also charges a camera 605 and a high-intensity light 606.

Image data from the robot's camera 605 is processed by the robot's processor 607 to facilitate navigation to a target location, where it can be utilized to perform security actions, such as apprehending, detaining, or disabling an offender. Photo and video imagery can be sent to a digital data link 609 or Bluetooth module 610 for transmission 612 to a public safety/emergency office 611 for further image processing, analysis, and real-time sharing of its findings with other MASS devices. The robot's camera 605 can be used to identify and track potential assailants approaching from any direction within its field of view. It can further be used as part of the "follow me" function. Other following techniques may also be applied, such as those in the AirDog product line (https://www.airdog.com).

The robot's light 606 can be used to brighten a space near or slightly ahead of an offender to illuminate a crime scene or to flash a warning signal. The robot may be equipped with multiple lights of variable intensity. The light 606 can operate in a flashing or strobing mode to temporarily blind an assailant and allow time for an intended victim to escape. Block 608 is a speaker or sound generator, capable of being activated via the embedded processor 607. It can provide a warning sound to a possible assailant, or broadcast a prerecorded message, such as an admonition that authorities have been contacted.

Figure 7:
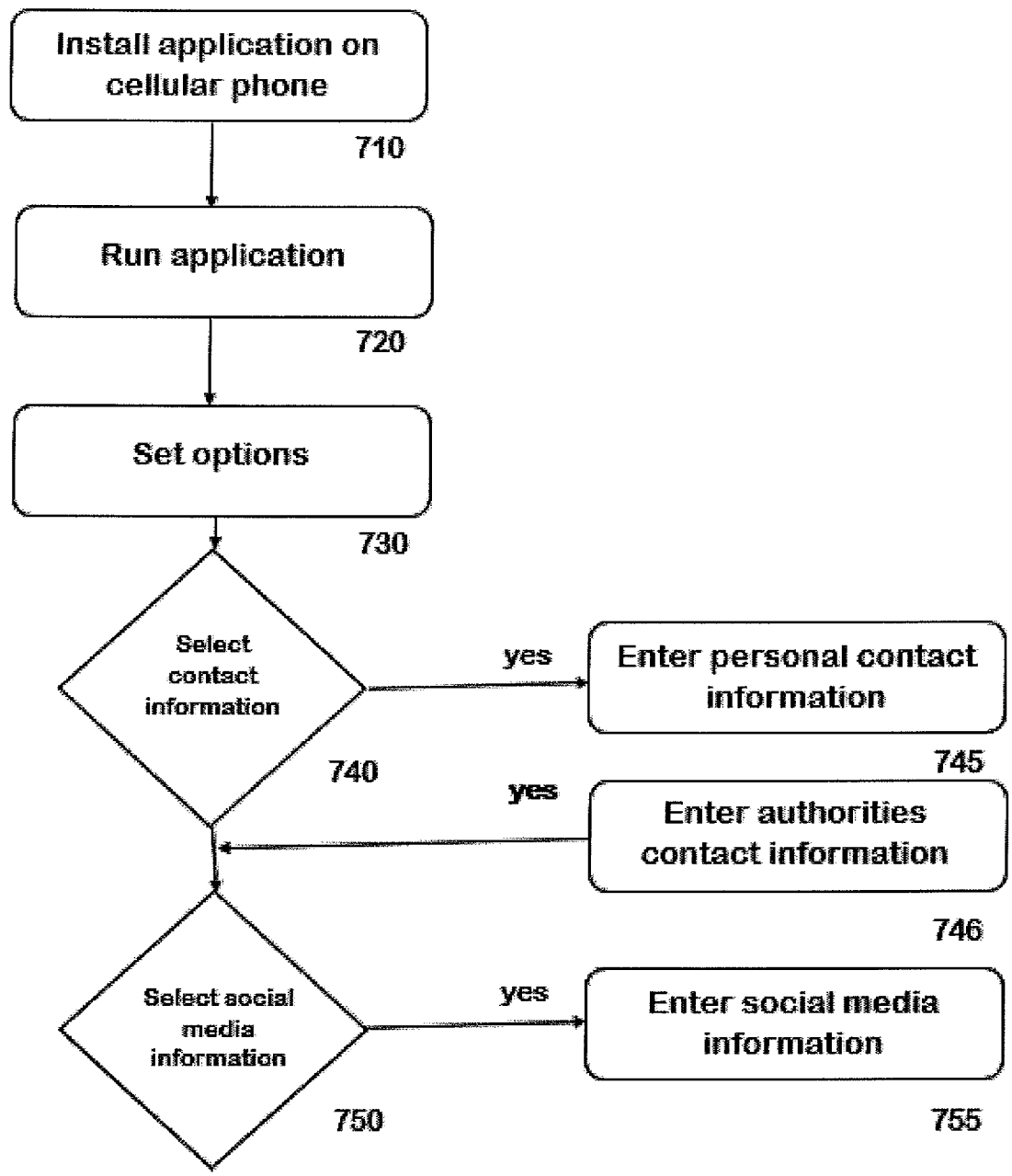
FIG. 7 presents a flowchart of the software installer used to set-up and run the MASS application's multiple tiers.

FIG. 7 shows a flowchart of the software installer 700 used to set-up and run the MASS application for tiered devices in the system. Block 710 represents MASS system users installing the application on their personal cell phones. As is known in the art, this is accomplished by downloading the MASS application from one of the various vendors' software repositories, such as the Apple Store or Google Play. Once the application is installed, the user runs the application in Block 720. Its graphical user interface has been designed for simplicity and ease of use. It controls how the networked MASS users connect and interact with one another. In Block 730, the user is prompted to select various features and options that work for one's particular school and circumstances. In Block 745 and 746, users are asked to enter personal and professional contact information into the system. This ensures that in an emergency, the holder of a cell phone in the MASS system, which typically will be connected wirelessly to PSD #1 or PSD #2, is put in contact with supportive resources. When either device is activated, one's personal contacts and authorities are automatically notified. The user will also be prompted in Block 750 to send emergency messages to social media sites, such as Twitter, Facebook, and Instagram. If so inclined, the user enters social media address in Block 755.

Figure 8:
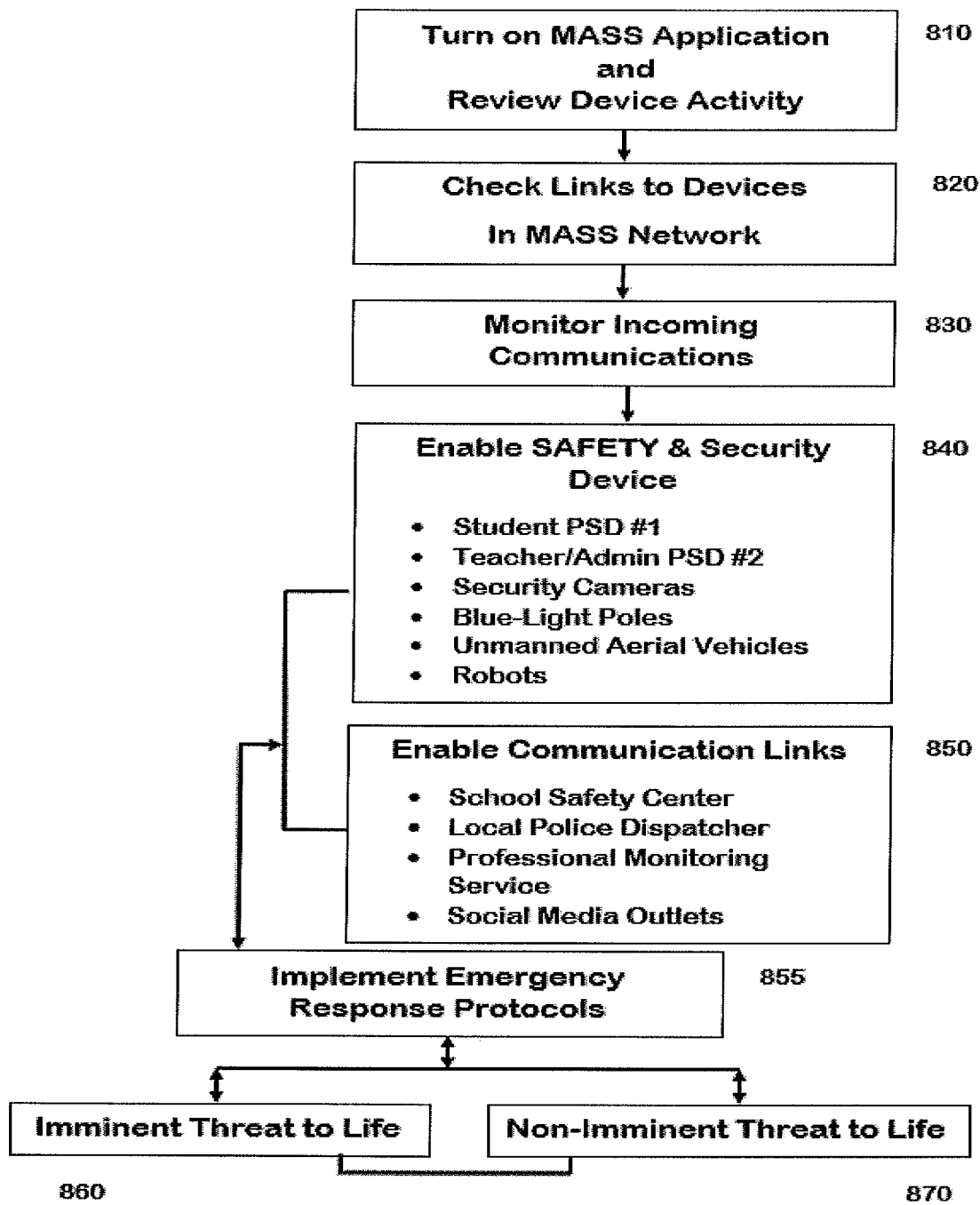
FIG. 8 presents a flowchart of the software running on the command and control module of the MASS system.

FIG. 8 shows a flowchart of the software running on the MASS command and control module 800. In Block 810, a public safety officer signs into the MASS application, typically when coming on duty. The officer is then prompted in Block 820 to check status of all links for connected devices in the MASS system. For quick reference, emergency situations flash repeatedly on monitors. The officer is now positioned to view, manage and respond, Block 830, to incoming communications that may be received by any device 840 in the MASS system. These include contacts for personal safety devices #1 for students and personal safety devices #2 for teachers/administrators; security cameras; Blue-light poles; unmanned aerial vehicles (UAVs); robots; local police dispatchers; professional monitoring services; and social media communications.

Once an emergency is reported, emergency contacts 850 are automatically made. An emergency response protocol 855 is then instantly enabled. It guides the public safety officer to appropriate responses, based on inputs from deployed devices in the MASS system. If incoming data identifies an imminent threat to life 860, then the officer is given control over defense tools mounted on UAVs 861 and/or robots 862. Responses will also be carried out by law enforcement and emergency responders 863. From his vantage point, the control officer is positioned, like a SWAT team commander, to provide specific instructions on how best to mitigate the threat. If the threat does not pose an imminent thrust to life 870, then the officer will be guided through another set of instructions to help diffuse the situation.

Depending on the emergency, any number of proactive steps may be implemented. Actions may include use of a UAV 861 or robot 862 to disable and or track an assailant, secure a perimeter, and/or gather evidence of wrongdoing. As appropriate, security cameras 864 may be slewed in real-time for multiple view angles of the situation, to document the emergency, and best deploy law enforcement/first responders 865 to resolve the incident. In all cases, the network can be employed to alert cellphone users 870 in the MASS system of the threat and how best to react to it.

As delineated into the above Figures, this invention offers a new solution to existing school security systems. The MASS system takes maximum advantage of utilization of cellphones and RFID tags among students of all ages. This is critical because as a *Pew Research Center, Mobile Fact Sheet* Report, Apr. 7, 2021, states: The "vast majority of Americans today are increasingly connected to the world of digital information via smartphones and other mobile devices. In the age group 18-29, ownership of a cell phone is 100%; 96% of this demographic specifically owns a smartphone, smart watch, or tablet computer. Additionally, younger student are increasingly connected with wireless RFID tags that use radio frequency technology to search, identify, track, and communicate with items and people. Parents and administrators can also use these devices to keep track of people, especially students. Such devices are unobtrusive enough to be attached or mounted onto people or belongings. For younger students, these devices can be attached to an article of clothing, backpack, etc. and will operate both on and off of school grounds.

In this way, students can be identified upon entering and exiting school grounds, as can the identity of those people with them, and specifically of people who may pose a threat to public safety. MASS devices can also play a vital role in pinpointing erratic and abnormal behavior that bears close scrutiny. The MASS command and control module can also be used to automatically lock down buildings and entry points.

While the above detailed description has shown, described, and pointed out novel features, as applied to various embodiments, it should be understood that various changes, modifications, alterations, omissions, substitutions, and changes in the form and details of the illustrated devices and/or algorithms can be made without departing from the letter and spirit of the disclosure. As can be recognized, certain embodiments described herein can be expressed within a form that does not provide all of the features and benefits set forth herein. Some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A system for improving school safety, comprising:
   a) (i) a plurality of fixed safety/security devices and (ii) a plurality of mobile safety/security devices located in selected locations in school property, said devices having sensors for detecting the presence of threats to life and property within said space, said threats comprising one or more persons within said school property, at least one of said mobile safety/security devices comprising an unmanned aerial vehicle;
   b) a source of communication among said devices for sharing information concerning said threats and coordinating actions in reaction to sensing of said threats;
   c) a controller connected to said devices and said sensors, said controller receiving one or more signals from said sensors indicating the presence of one or more threats to life and property within said space and responsive to reception of said signals, activating one or more said sources of communication to notify security personnel to initiate appropriate action to deter or repel said threats within said space, said controller including a processor programmed with a machine learning algorithm to facilitate recognition of threats to be deterred or repelled;
   d) further including a plurality of fixed means for optically monitoring said school property strategically located within a designated perimeter and sending signals comprising images to said controller and further including an optical safety device programmed with a people detection algorithm facilitating rapid detection of approaching person or persons, said people detection algorithm providing person or face recognition capability; and
   e) at least one of said plurality of mobile safety/security devices including incorporated defensive measure capability chosen from the group consisting of a flashing strobe light, an explosive dye pack, a chemical spray, and a shocking mechanism.

2. The system of claim 1, wherein said sensors comprise a camera on each of said fixed and mobile devices, each camera aimed at a location in said school property.

3. The system of claim 2, wherein each camera is movable to sweep across a space within said school property.

4. The system of claim 1, wherein said devices comprise cellphones.

5. The system of claim 4, wherein each of said devices is connected to a personal safety device.

6. The system of claim 5, wherein each said personal safety device upon activation is capable of causing an alarm to be emitted.

7. The system of claim 5, wherein each said personal safety device upon activation transmits messages to cellphones, authorities, and a professional monitoring service.

8. The system of claim 5, wherein each said personal safety device upon activation transmits its location, audio and a video recording to other cell phones, authorities, and a professional monitoring service.

9. The system of claim 5, wherein each of said devices is a cellphone connected to a personal safety device containing a camera.

10. The system of claim 5, wherein each of said devices is a cellphone connected to a personal safety device containing a camera that can record audio and video.

11. The system of claim 5, wherein each said personal safety devices comprises defense instruments capable of deterring and repelling threats, day and night.

12. The system of claim 1, wherein said unmanned aerial vehicle contains sensors capable of detecting threats from the air, day or night, in said space.

13. The system of claim 1, wherein said device comprises an unmanned aerial vehicle with defense instruments capable of deterring and repelling threats from the air, day or night.

14. The system of claim 1, wherein at least one of said devices comprises a robot.

15. The system of claim 14, wherein said robot contains sensors capable of detecting threats, day or night, in said space from the ground.

16. The system of claim 14, wherein said robot includes defense instruments capable of deterring and repelling threats, day and night, from the ground.

17. The system of claim 1, wherein at least one of said devices is a light pole equipped with wireless transmission capability.

18. The system of claim 17, wherein said light pole includes existing alarm and communication functions augmented with sensors capable of detecting threats, day or night, in its said space.

19. The system of claim 1, wherein said threats include human, animal, or a manmade object.

* * * * *